United States Patent
Stocker et al.

(10) Patent No.: US 9,759,260 B2
(45) Date of Patent: Sep. 12, 2017

(54) SUPPORT BEARING, IN PARTICULAR RUNNING ROLLER

(71) Applicant: Schaeffler Technologies AG & Co. KG, Herzogenaurach (DE)

(72) Inventors: Manfred Stocker, Bergrheinfeld (DE); Witold Marek Smolenski, Dittelbrunn OT Hambach (DE); Hans-Joachim Drabek, Mettmann (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 99 days.

(21) Appl. No.: 14/898,919

(22) PCT Filed: Jun. 10, 2014

(86) PCT No.: PCT/DE2014/200253
§ 371 (c)(1),
(2) Date: Dec. 16, 2015

(87) PCT Pub. No.: WO2015/003696
PCT Pub. Date: Jan. 15, 2015

(65) Prior Publication Data
US 2016/0369846 A1    Dec. 22, 2016

(30) Foreign Application Priority Data

Jul. 8, 2013 (DE) .......................... 10 2013 213 332

(51) Int. Cl.
*F16C 33/58* (2006.01)
*F16C 13/00* (2006.01)
(Continued)

(52) U.S. Cl.
CPC .......... *F16C 33/585* (2013.01); *F16C 13/006* (2013.01); *F16C 13/02* (2013.01);
(Continued)

(58) Field of Classification Search
CPC ........ F16C 13/006; F16C 13/02; F16C 19/38; F16C 33/05; F16C 33/583; F16C 33/585; F16C 2240/12; F16C 2240/50
See application file for complete search history.

(56) References Cited

U.S. PATENT DOCUMENTS

| 3,321,256 A | 5/1967 | Orain |
| 3,384,426 A | 5/1968 | Schumacher, Jr. |

(Continued)

FOREIGN PATENT DOCUMENTS

| AT | 254633 | 5/1967 |
| CN | 101749326 | 6/2010 |

(Continued)

*Primary Examiner* — Phillip A Johnson
(74) *Attorney, Agent, or Firm* — Volpe and Koenig. P.C.

(57) ABSTRACT

A support bearing, for example for straighteners, having an outer ring, an inner ring and rolling bodies that roll between the outer and inner ring on raceways. A bending moment prevails between the rings as a result of a load with a fixed direction of action. To compensate for the bending moment, an outer raceway of the inner ring and/or an inner raceway of the outer ring includes a profiling with a variable diameter in the axial direction. The profiling is adapted or approximated to a non-cylindrical bending line caused by the bending moment in the rolling contact, and the bending line is defined by a line, on which bending forces which are transmitted from the inner ring to the rolling bodies and are caused by the bending moment lie substantially perpendicularly. As a result, the disadvantageous edge loading in a given load direction is suppressed, with the result that more rolling bodies can transmit load between the rings at the same time.

10 Claims, 4 Drawing Sheets

(51) Int. Cl.
*F16C 13/02* (2006.01)
*F16C 19/28* (2006.01)

(52) U.S. Cl.
CPC .......... *F16C 19/28* (2013.01); *F16C 2322/12* (2013.01); *F16C 2326/02* (2013.01)

(56) References Cited

U.S. PATENT DOCUMENTS

| | | | | |
|---|---|---|---|---|
| 5,449,154 | A | * | 9/1995 | Lob .......... B66D 3/04 254/394 |
| 6,354,745 | B1 | * | 3/2002 | Ai .......... F16C 19/26 384/565 |
| 6,616,338 | B2 | | 9/2003 | Tibbits |
| 8,591,115 | B2 | | 11/2013 | Mori |
| 2007/0041677 | A1 | | 2/2007 | Masuda et al. |

FOREIGN PATENT DOCUMENTS

| | | | | |
|---|---|---|---|---|
| DE | 2154836 | | 5/1972 | |
| DE | 10004584 | | 5/2001 | |
| DE | 10337581 | | 3/2005 | |
| DE | 102004040938 | | 3/2006 | |
| DE | 102010036248 | | 3/2012 | |
| DE | 102012210404 | | 12/2013 | |
| JP | 09014131 A | * | 1/1997 | .......... F04B 27/1063 |
| JP | 2002143928 | | 5/2002 | |
| JP | 2002327752 A | * | 11/2002 | .............. F16C 13/02 |
| JP | 2007132409 | | 5/2007 | |
| JP | 2008224026 | | 9/2008 | |

* cited by examiner

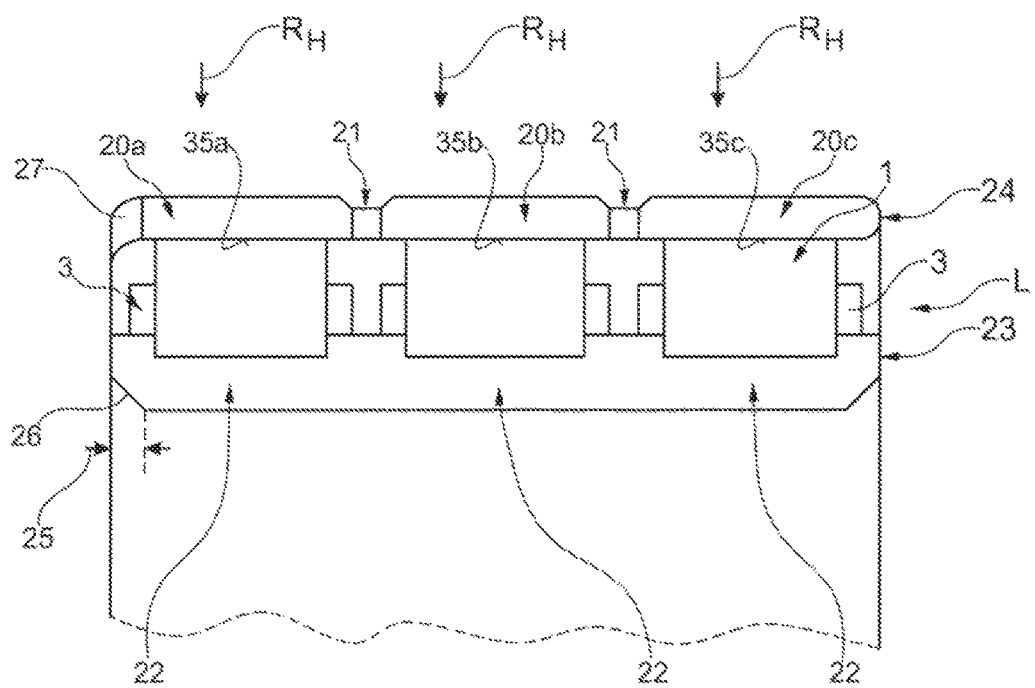
Fig. 3
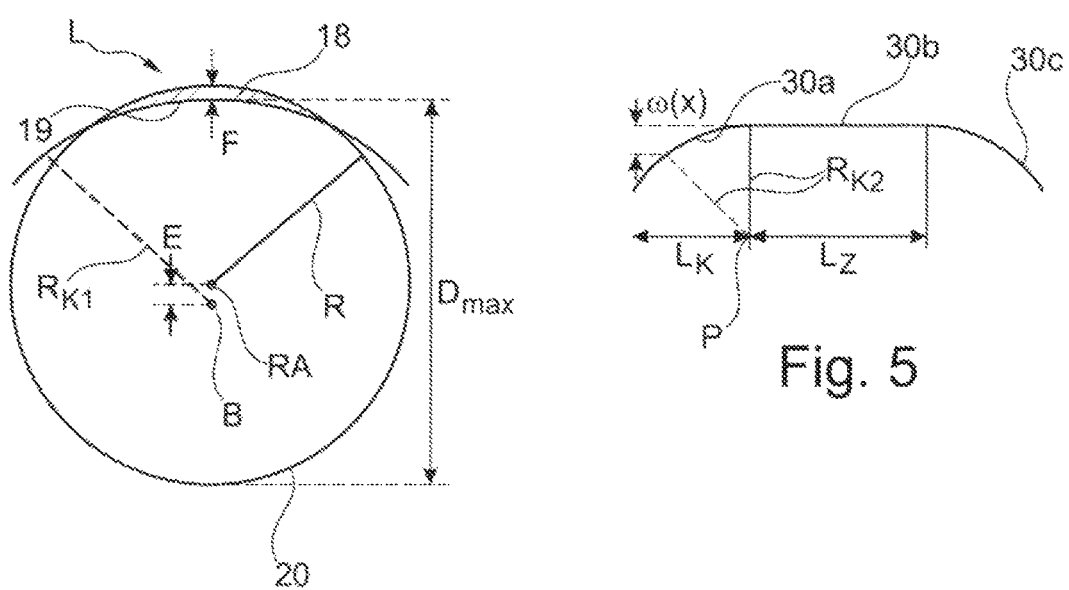
Fig. 4
Fig. 5

SUPPORT BEARING, IN PARTICULAR RUNNING ROLLER

The invention relates to a support bearing, for example, for straightening machines, with an outer ring, an inner ring, and rolling bodies that can roll on raceways between the outer ring and the inner ring, wherein a bending moment between the rings is applied by a load with fixed effective direction.

FIELD OF THE INVENTION

For the support bearing (also called mounting-supporting bearing), the axial orientation of the shaft is taken over by one or more bearings depending on the direction of the introduced force. Support bearings include running rollers, in particular, support rollers, cam rollers, or ball bearing running rollers. Support rollers are ready-to-install needle or cylinder roller bearings with especially thick-wall outer rings that are used, among other things, in multi-roller power rolling stands, straightening machines, cam transmissions, guide tracks, conveying systems, and linear guide systems (e.g., DE 10 2010 036 248 A1).

BACKGROUND

Cam rollers are support rollers with an axial guide, wherein, instead of the inner ring, a solid roller pin is provided. The roller pin has a fastening thread and, in many cases, a hexagon socket on both sides. In contrast, running rollers are equal in their structure to groove or inclined ball bearings, but there are thick-walled outer rings with a rounded lateral surface.

Support rollers are provided to receive high radial loads, but also axial loads from two axial directions. Therefore, needle rollers or cylinder rollers are often used as rolling bodies.

It is further problematic that just the area of the rolling contact can be particularly affected by edge wear due to bending moments and the service life of the support bearing is also significantly adversely affected. Furthermore, enormous imbalance loads can be produced between the outer and inner rows of rolling bearings. The rolling bodies thus experience a very non-uniform support, wherein the lowest contact pressures between the rolling bodies and shaft occur in the center of the support bearing and the highest pressures occur at the edge of the support bearing.

SUMMARY

The invention is based on the objective of at least reducing the effects of a bending moment, for example, of a pin bending, without adversely affecting other properties of the support bearing.

This object is achieved for a support bearing of the type described above in that an outer raceway of the inner ring and/or an inner raceway of the outer ring have a profiling with a diameter that changes in the axial direction, wherein the profiling is equal to or approximately equal to a bending line in rolling contact caused by the bending moment and the bending line is a line that is essentially perpendicular to the bending forces transmitted by each ring to the rolling body and caused by the bending moment. In this way, the bending forces can be distributed essentially uniformly over the rolling contact, wherein the rolling contact is understood to be the surface where the rolling body and raceway touch, especially under consideration of the elasticity of the rolling body.

The axial direction is understood to be a direction running parallel to the rotational axis of the support bearing. Here the inner ring can be integrated into a solid shaft, a solid pin, or a solid axle journal, wherein the profiling of the outer raceway is formed on the solid shaft or solid pin or solid axle journal. In this context, solid means that the inner ring is integrated into a component that has essentially no hollow spaces apart from lubricant supply or lubricant holes or the like.

In one advantageous embodiment, the inner ring can be brought or pressed onto a shaft, pin, or axle journal and is secured against torsion relative to the shaft, pin, or axle journal. This can be the case both for a rotating and also stationary inner ring.

The profiling of the outer raceway of the inner ring can be defined by a radial correction function $w(x)$, wherein the local diameter $D(x)$ of the inner ring depends on $w(x)$ and a constant diameter $D_0$ in the following way:

$$D(x) = D_0 - 2 \cdot w(x);$$

$$w(x) = R_{K2} - R_{K2}^2 - x^2)^{-0.5}$$

where x is an axial position on the inner ring and the second radius of curvature $R_{K2}$ is selected as a function of direction and/or magnitude of the bending moment and especially also the support bearing properties. The second radius of curvature $R_{K2}$ can be determined by estimation, bearing wear analysis, or computer simulation of the support bearing or its rolling behavior. The second radius of curvature $R_{K2}$ is, for example, between 5000 to 30000 mm. Here, the bending line does not have to be simulated exactly, but an approximation of the bending line can already lead to an increase in the service life that is sufficient for typical use. Here, the profiling can also have cylindrical and rounded areas, because these must be adapted to the support bearing geometry or the rolling bodies, if necessary.

Advantageously, the inner ring or the outer ring are rigidly connected directly or indirectly to a bearing block. The bearing block has the function of a base or anchor that receives the load guided through the support bearing.

When the rolling bodies are arranged in two, three, or four rows of rolling bodies, a larger rolling contact surface with which the support bearing can support greater loads can be achieved overall. Here, the bending line for each row of rolling bodies can have a different profile, because normally the outer rows of rolling bodies must receive bending forces directed in different directions than inner rows of rolling bodies. Therefore, it can be advantageous to provide inner rows of rolling bodies on cylindrical areas of the profiling and outer rows of rolling bodies on rounded areas of the profiling, in order to distribute the load uniformly to the rows of rolling bodies.

In one advantageous embodiment, each row of rolling bodies is allocated to a cylindrical or rounded area of the profiling.

In a stationary inner or outer ring it is advantageous when this has supply or infeed openings for a lubricant, in particular, lubricating oil or lubricating grease.

In one advantageous embodiment, an outer raceway of the inner ring or an inner raceway of the outer ring has, in the area of a load zone in the circumferential direction, a smaller curvature (flattened section) than the raceway outside of the load zone. Here, the load zone is understood to be an area between the outer raceway and inner raceway through which the rolling bodies can roll and here transmit support loads between the raceways in greater degrees. This load zone is oriented in the direction of the support load. The circumferential direction is understood to be a rolling direction in which the rolling bodies can roll or the opposite direction.

In one advantageous embodiment, at least three, four, or five rolling bodies of a row of rolling bodies simultaneously transmit an increased percentage of the support force between the outer ring and inner ring. Thanks to a profiling according to the invention, due to the minimized or eliminated edge wear of multiple rolling bodies, in particular, for a plurality of rows of rolling bodies, a weight-bearing function can be simultaneously taken over. The support bearing is not adversely affected by the deformation introduced by the bending moment.

Advantageously, the inner ring has the smaller curvature on its raceway in the area of the load zone in the circumferential direction than the raceway outside of the load zone. For this purpose, the inner ring must be a stationary ring relative to the support load. Because the lower curvature must remain in the load zone during the rolling bearing operation, thus oriented with respect to the load direction, in particular, toward the load or away from the load.

From there it is advantageous to attach a helping aid (for example, a marking) to the support bearing on the outside, wherein it can be identified using this aid how the support bearing should be oriented for installation, for example, a support roller. Ideally, this helping aid could emphasize alignment for an optimum position or could be oriented correctly by means of a groove. This helping aid is required only for a stationary inner ring with different curvature in the circumferential direction.

For a support bearing, for example, a running roller, a lower pretensioning of the rolling bodies could be generated in a pre-installed state (without load) in the load zone of the support bearing, because the smaller curvature is formed on the outer raceway of the inner ring and material is removed on the inner ring. It is important that the arrangement of the load zone of the support bearing is specified by the formation of the curvature on the inner ring for the support bearing.

In one advantageous embodiment, the curvature in the circumferential direction is specified by a first radius of curvature $R_{K1}$, wherein the first radius of curvature $R_{K1}$ is defined by a sum from the increase in radius $\Delta r$ and the radius R of each raceway:

$$R_{K1} = R + \Delta r;$$

$$E = \Delta r + F,$$

where the eccentricity E of each raceway is formed from a sum from the increase in radius $\Delta r$ and a maximum material removal F that is required for forming a smaller curvature. In other words, the radial distance of the outer raceway to the rotational axis is smaller in the area of the curvature than on the other outer raceway. The bigger the change in radius $\Delta r$ is selected, the larger the maximum material removal F must be. The increase in radius $\Delta r$ and the material removal F should be adapted to an optimum load distribution in the circumferential direction; for example, for a section that is too flat, the rolling bodies on the sides receive higher loads than rolling bodies in the middle.

The best results are produced by a curvature in the circumferential direction—also called flattened section below for simplicity—whose smaller curvature in the circumferential direction is defined by a first radius of curvature $R_{K1}$ that is greater by 0.2% to 0.8% of the raceway diameter D than the raceway radius R, that is, between $R_{K1}=0.002*D+R$ to $R_{K1}=0.008*D+R$.

For best results, the maximum material removal F should be between 0.1% to 0.6% of the raceway diameter D, that is, between $F=0.001*D$ and $F=0.006*D$.

Advantageously, the inner or outer ring has, in the area of the load zone in the circumferential direction, a smaller curvature than outside of the load zone, wherein each ring can be fixed by means of a rotational locking device with respect to the support force. This rotational locking device can be implemented in different ways, wherein this is partially or completely realized by an additional flattened section or a groove. In this way it is guaranteed that the curvature acts in a load-distributing way only when the rolling bodies should also carry a load.

In one advantageous embodiment, the inner or outer raceway has a profiling with outer diameter that changes in axial width, wherein the profiling is equal to or approximately equal to a bending line in rolling contact caused by the bending moment and the bending line is defined by a line that is essentially perpendicular to the bending forces transmitted from the inner ring to the rolling bodies and caused by the bending moment. In this way, the bending forces can be distributed essentially uniformly over the rolling contact, wherein the rolling contact is understood to be the surface on which the rolling body and raceway touch, especially under consideration of the elasticity of the rolling body.

It is noticeable that the profiling according to the invention varies in contrast to the curvature in the axial direction and can be designed independent of a curvature in the circumferential direction. The curvature in the circumferential direction can be completely different, for example, can have more than two curvatures. Thus, curvatures in the circumferential direction and also in the axial direction can be combined. First, the profiling can also be formed on the rotating inner or outer ring, in particular, also on a stationary inner ring, in which the outer raceway has, in the area of the load zone in the circumferential direction, a smaller curvature than outside the load zone. Thus, the profiling and curvature can be superimposed without additional means.

Advantageously, the rolling bodies are needle rollers, cylinder rollers, or conical rollers, logarithmically profiled needle rollers, logarithmically profiled cylinder rollers, or logarithmically profiled conical rollers. The shape of the rolling bodies must not be changed so that the diversity of components can be kept low. The rolling bodies can be produced according to a defined standard, also for other bearings. The consideration of the bending moment between the outer and inner ring is realized by means of the approximation or equalization of the profiling of the outer raceway of the inner ring to the bending line caused there by the bending moment. The direction of the support load also does not have to be considered for the selection of rolling bodies.

Possible embodiments of the support bearing according to the invention can be realized as running rollers, in particular, support rollers or cam rollers.

Other advantageous constructions and preferred refinements of the invention are to be taken from the description of the figures and/or the dependent claims.

BRIEF DESCRIPTION OF THE DRAWINGS

The invention will be described and explained in more detail below with reference to the embodiments shown in the figures. Shown are.

DETAILED DESCRIPTION OF THE PREFERRED EMBODIMENTS

Figure 1:
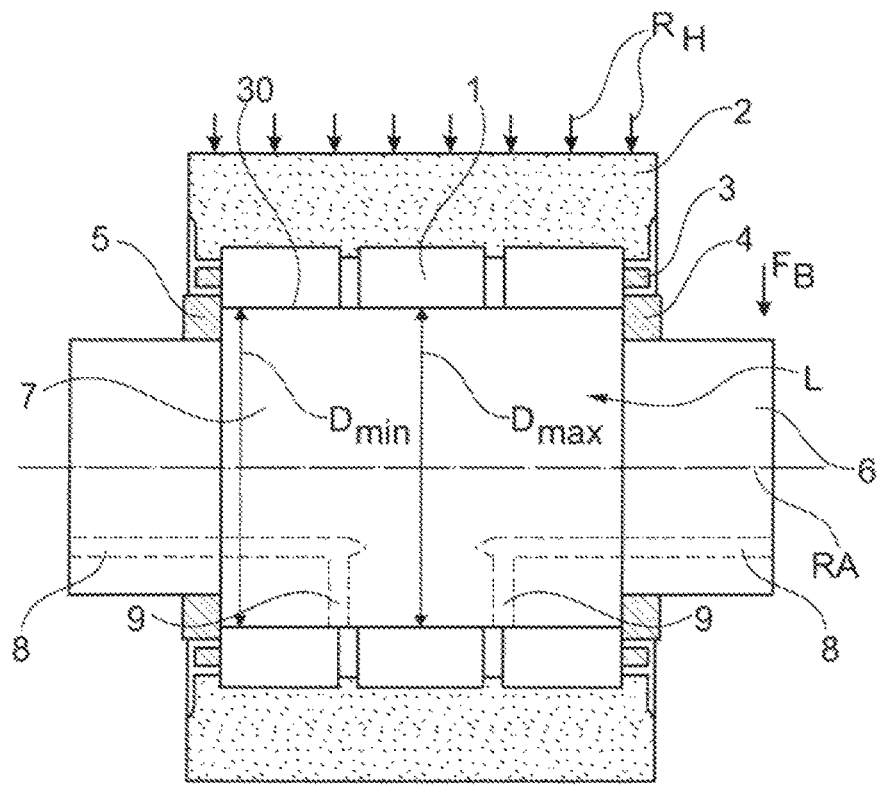
FIG. 1 a three-row support roller with cylinder rollers in longitudinal section along the rotational axis as a first embodiment, FIG. 2A a schematic illustration of a uniformly distributed support force, FIG. 2B a schematic illustration of a bending line in the presence of a bending moment, FIG. 3 a sectional view of a three-row support bearing with rotating inner ring as second embodiment, FIG. 4 an illustration of a raceway curvature in the circumferential direction with a first radius of curvature, FIG. 5 an illustration of a raceway curvature in the axial direction with rounded and cylindrical areas, FIG. 6 an inner ring on a pin of a third embodiment in three-dimensional view, FIG. 7 a two-dimensional view of the inner ring with pin from FIG. 6, FIG. 8 a fourth embodiment with needle bearings in longitudinal section, and FIG. 9 a schematic three-dimensional illustration of a pin outer surface with profiling and flattened section.

FIG. 1 shows a three-row support roller with rolling bodies 1 formed as cylinder rollers in longitudinal section along the rotational axis RA. The profiled pin section 7 is increased radially in comparison to the similarly stationary pin 6, in order to carry the three rolling body rows for a larger partial circle diameter. The profiling is formed on the outer surface of the pin section 7 and changes in the axial direction, wherein the profiling overall has a convex shape that forms, in the area of the middle row of rolling bodies, the greatest diameter D=$D_{max}$ and has, at the edges, the smallest diameter D=$D_{min}$. In the circumferential direction, the profiling does not change.

The profiling continues into the load zone L. The edge wear due to the bending moment is also normally highest in the area of the load zone L, so that, in the area of the shaft bending, the axially varying profiling is especially needed. The effect of the bending moment can be advantageously compensated in this way. In addition, it is advantageous that the inner raceway of the outer ring 2 does not have to have profiling or different raceway variations, therefore there is a high degree of freedom in the design of the shape.

The pin 6 is stationary and contains various holes 8, 9 that are provided for conducting oil to the rolling contact. The base rings 4, 5 provide for a correct seating of the seals 3 and prevent the axial runout of the rolling bodies 1 of the outer rows.

Figure 2A:
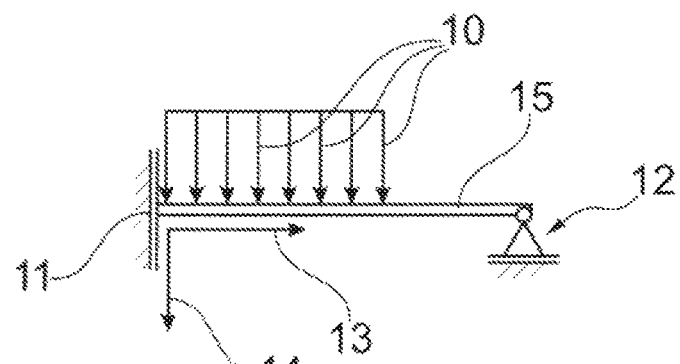

FIG. 2A shows a schematic illustration of the ideal case for an axially uniformly distributed support force 10. Wear of the support bearing would occur uniformly, which guarantees a long service life. This situation is provided for a support force introduced purely perpendicular to the rotational axis RA and on the support bearing, wherein the bending line 15 that is defined in the cross section along the rotational axis RA also forms a straight line at each position x 13. A profiling therefore would not be necessary. The outer raceway of the inner ring could have a cylindrical shape.

Figure 2B:
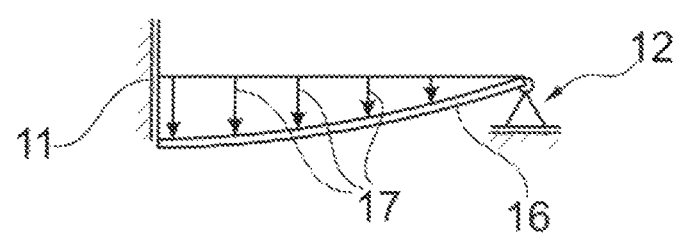

FIG. 2B shows a schematic illustration of a bending line 16 for an active bending moment. The correction function w(x) causes a diameter function D(x)=$D_0$−2*w(x) increasing in the direction of the holding point 12. The associated second radius of curvature $R_{K2}$ of the curvature in the axial direction can here assume values between 5000 and 30000 mm as a function of the bending line. The profiling radius is half as large as D(x) and changes as a function of the axial position x in the curved areas. In the cylindrical areas of the profiling, the profiling radius remains constant.

FIG. 3 shows a three-row support bearing with rotating inner ring 23. The feed of the lubricating oil is realized through the openings 21 that are arranged between the outer ring segments 20a, 20b or the outer ring segments 20b, 20c. Each row of rolling bodies has its own cage 3 and an individual profiling 22 that takes into account the bending moment of the whole support bearing arrangement (only the support bearing is shown). In addition, the inner raceways 35a, 35b, 35c are also profiled.

For simpler pressing, the shown support bearing, in particular, the support roller, has a conical area 26 on the inner ring 23.

On the outer ring section 20a, an end groove 27 is formed that can be used for aligning the outer ring 20.

FIG. 4 shows a rolling body raceway 20 of an inner ring with the radius R, starting from the rotational axis RA oriented perpendicular to the plane of the drawing, wherein the raceway 20 is a stationary raceway 20.

The less curved area is defined by the first radius of curvature $R_{K1}$ and begins or ends at the respective intersecting points with the raceway radius R, wherein the first radius of curvature $R_{K1}$ is machined to the reference point B that is arranged with respect to the rotational axis RA relative to the maximum material removal F. The distance of the reference point B relative to the rotational axis RA is the eccentricity E that is formed from the sum of the radial difference and the maximum material removal F:

$$E=R_{K1}-R+F$$

Figure 6:
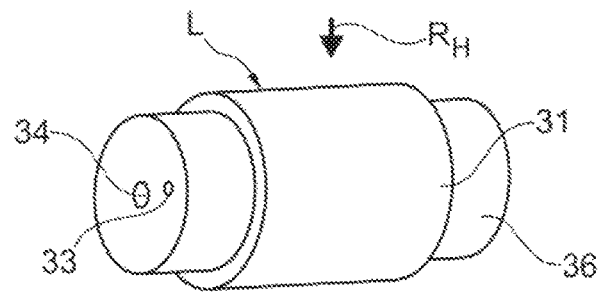

With respect to FIG. 1, the raceway 20 shown in FIG. 4 involves the outer raceway of the pin section 7 of the middle row of rolling bodies or alternatively the outer raceway of the inner ring 31 of FIG. 6. The profiling cannot be identified due to the cut surface of FIG. 4 oriented perpendicular to the rotational axis RA.

FIG. 5 shows a profiling in the axial direction with a cylindrical area of length $L_Z$ and with two laterally adjacent, curved areas of length $L_X$. The second radius of curvature $R_{K2}$ is referenced to point P and is shown exaggerated. The curvatures permit an approximation to the bending line of the outer two raceways 30a and 30c. The middle raceway 30b is not critical due to its position and therefore has a cylindrical design. A curvature in the axial direction can be omitted.

Figure 7:
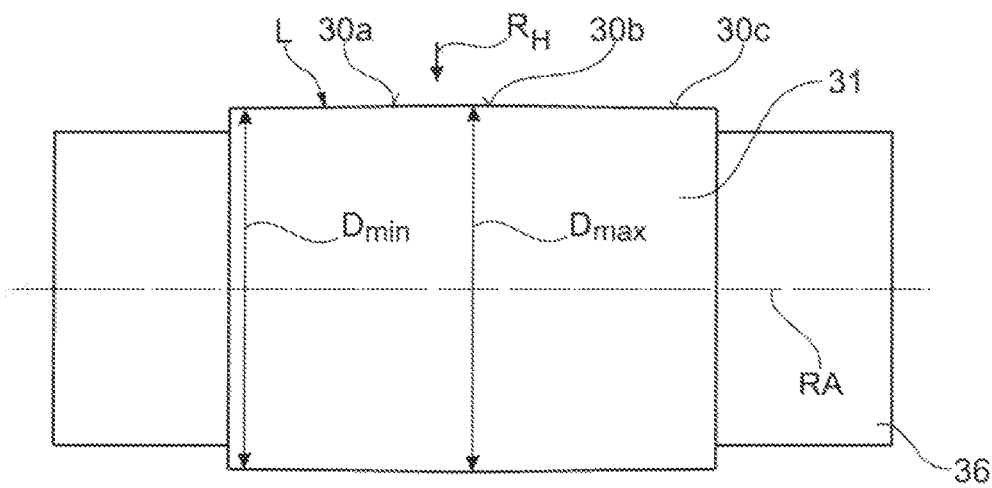

FIGS. 6 and 7 show an embodiment of an inner ring 31 with pin 36 in a third embodiment in three-dimensional or two-dimensional view. The outer raceways 30a, b, c of the inner ring 31 are profiled in the axial direction and also have a curvature and a profiling in the load zone L that is defined by the main direction of the support force $R_H$. Interestingly, the pin 36 can be made from a less expensive steel, wherein the inner ring 31 made from rolling bearing steel is set on the pin 36. Here, the outer shape of the pin 36 is adapted in the area of the inner ring seat to the inner ring 31 and has a positioning effect in the axial direction. This pin inner ring arrangement can replace the one-piece pin 6 of the embodiment of FIG. 1 in an economical way.

In the assembled state, the rows of rolling bodies have different radial clearance values. This means that the rolling bodies are loaded non-uniformly in a low load state between the rings without bending. This is not problematic, however, because both the edge wear in the support bearing and also the non-uniform loading of the rows of rolling bodies have little influence with respect to the service life.

Figure 8:
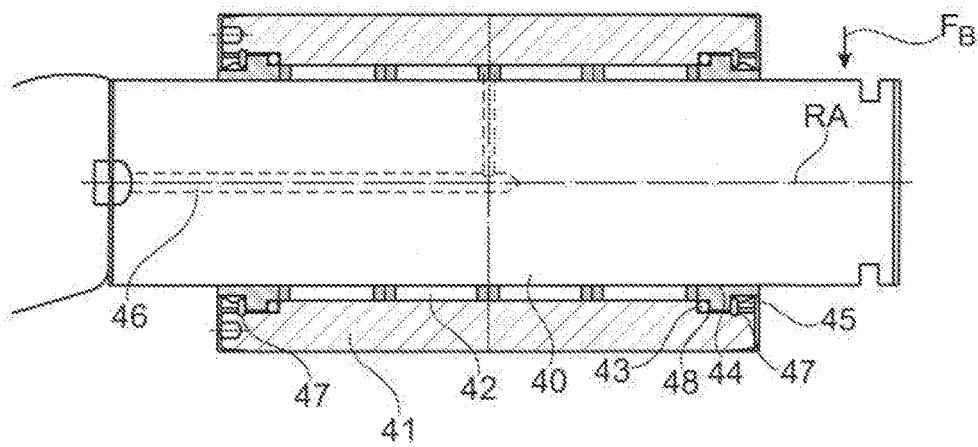

FIG. 8 shows another embodiment in longitudinal section along the rotational axis RA. The shown support bearing is based on needles as rolling bodies 42 that roll on the profiled, stationary shaft 40 that contains lubricating oil supply 46 in its interior. The rolling bodies 42 are held axially by the holding rings 48 that are provided for holding a lip seal 45 and are also sealed toward the outer ring 41 with an O-ring 48. In addition, the holding rings 48 have a radially placed groove 44.

The entire arrangement is secured with the snap-on rings 47 attached on both sides and compensates the bending of the pin by means of a profiling on the pin 40. Optionally, profiling could still be provided on the inner raceways of the outer ring 41.

Figure 9:
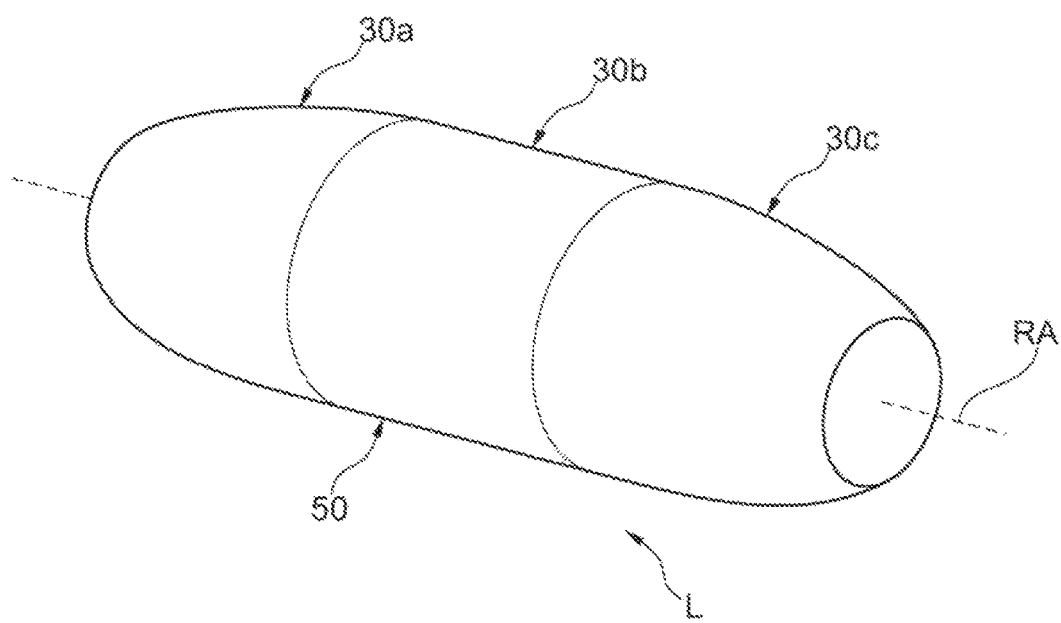

FIG. 9 shows a schematic illustration of a pin outer surface, as could be provided in the embodiment of FIGS. 6 and 7.

The shown pin outer surface is provided with three outer raceways 30*a*, *b*, *c*, namely two outer raceways 30*a*, *c* and one middle raceway 30*b*. The outer raceways 30*a*, *c* are arranged in the profiled area of the pin, wherein the profiling is shown schematically for better illustration (with an exaggerated small profiling radius $R_{K2}$). The middle raceway 30*b* runs on a middle, cylindrical section of the pin. All of the raceways are formed integrally with the profiling in the circumferential direction (flattened section) 50. This means that the axial profiling in the load area transition at least partially into the profiling in the circumferential direction 50, in particular, this is not formed over the entire circumference but instead only in the load area.

All radii of curvature must be designed sufficiently large enough that the transitions between the flattened section 50 and the pure profiled area do not cause damage during the rolling operation.

In addition, it is to be stated generally for all embodiments that both the inner ring and also the outer ring have a ring shape with respect to the respectively formed raceway. The inner ring must be radially on the inside but does not necessarily have to have a ring shape. Instead it could be solid or have any other conceivable shape or could be partially or completely integrated into a different component, wherein the component itself does not have to have a ring shape. A corresponding situation exists for the shape of the outer ring in the radial direction outward away from its inner raceway.

LIST OF REFERENCE SYMBOLS

B Reference point
E Eccentricity
F Maximum material removal
$F_B$ For generating the bending moment
L Load zone
R Raceway radius
RA Rotational axis
$R_H$ Main direction of support force
$R_{K1}$ First radius of curvature in the circumferential direction (flattened section)
$R_{K2}$ Second radius of curvature of the profiling in the axial direction
1 Rolling body
2 Outer ring
3 Rolling bearing cage
4 Right base ring
5 Left base ring
6 Pin
7 Profiled pin section
8 Axial hole for lubricant line
9 Radial hole for lubricant line
10 Support force
11 Boundary
12 Holding point
13 Axial position x
14 Force direction
15 Bending line
16 Bending line
17 Radial correction function w(x)
18 Material removal
19 Raceway area with reduced curvature
20*a* Outer ring segment
20*b* Middle ring segment
20*c* Outer ring segment
21 Lubricant opening
22 Individual profiling
23 Inner ring
24 Outer ring
25 Axial width of conical area
26 Conical area
27 End groove
30*a* Outer raceway on outer surface
30*b* Middle raceway on outer surface
30*c* Outer raceway on outer surface
31 Inner ring
33 Lubricant opening
34 Opening
35*a* Profiled inner raceway
35*b* Profiled inner raceway
35*c* Profiled inner raceway
40 Pin
41 Outer ring
42 Needle
43 O-ring
44 Inner groove
45 Lip seal
46 Lubricating oil supply
47 Snap-on ring
48 Retaining ring
50 Flattened section

The invention claimed is:

1. A support bearing comprising an outer ring, an inner ring, and rolling bodies that roll between the outer ring and the inner ring on raceways thereof, wherein a bending moment between the rings is applied by a load with a fixed effective direction, wherein at least one of the raceway on an outer surface of the inner ring or the raceway on an inner surface of the outer ring has a profiling with a diameter (D) that changes in an axial direction, the profiling is at least approximately equal to a bending line in rolling contact caused by the bending moment and the bending line is a line that is essentially perpendicular to the bending forces transmitted by each ring to the rolling body and caused by the bending moment, and the raceway on the outer surface of the inner ring has, in an area of a load zone (L) in the circumferential direction, a smaller curvature than the raceway of the inner ring outside of the load zone (L).

2. The support bearing according to claim 1, wherein the inner ring is integrated into a solid shaft, a solid pin, or a solid axle journal, and the profiling of the raceway on the outer surface is formed on the solid shaft, the solid pin, or the solid axle journal.

3. The support bearing according to claim 1, wherein the inner ring is brought onto a shaft, pin, or axle journal and secured against torsion.

4. The support bearing according to claim 1, wherein the profiling of the raceway on the outer surface of the inner ring is defined at least in one area by a radial correction function w(x) and a diameter D(x) of the inner ring depends on w(x) and a constant diameter $D_0$ in the following way:

$$D(x)=D_0-2*w(x);$$

$$w(x)=R_{K2}-R_{K2}{}^2-x^2)^{-0.5}$$

where x is an axial position on the inner ring and a second radius of curvature ($R_{K2}$) is selected as a function of at least one of a direction or magnitude of the bending moment.

5. The support bearing according to claim 4, wherein the second radius of curvature ($R_{K2}$) is between 5000 to 30000 mm.

6. The support bearing according to claim 1, wherein the rolling bodies are arranged in two, three, or four rows of rolling bodies.

7. The support bearing according to claim 6, wherein at least four rolling bodies of a row of rolling bodies transmit an increased percentage of a support force between the outer ring and inner ring.

8. The support bearing according to claim 1, wherein the smaller curvature is defined in the circumferential direction by a first radius of curvature ($R_{K1}$) that is greater by 0.2% to 0.8% of the raceway diameter (D) than a raceway radius (R).

9. A running roller comprising the support bearing according to claim 1.

10. A straightening machine comprising the support bearing according to claim 1.

* * * * *